(12) United States Patent
Sethi et al.

(10) Patent No.: US 12,170,716 B2
(45) Date of Patent: Dec. 17, 2024

(54) CONVERSION OF DATA PACKETS BASED ON INTERNET PROTOCOL VERSION

(71) Applicant: Dell Products L.P., Round Rock, TX (US)

(72) Inventors: Parminder Singh Sethi, Ludhiana (IN); Atishay Jain, Meerut (IN); Anay Kishore, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/106,151

(22) Filed: Feb. 6, 2023

(65) Prior Publication Data

US 2024/0267440 A1 Aug. 8, 2024

(51) Int. Cl.
*H04L 69/167* (2022.01)
*H04L 69/08* (2022.01)
*H04L 69/22* (2022.01)

(52) U.S. Cl.
CPC ............ *H04L 69/167* (2013.01); *H04L 69/08* (2013.01); *H04L 69/22* (2013.01)

(58) Field of Classification Search
None
See application file for complete search history.

(56) References Cited

U.S. PATENT DOCUMENTS

| | | | | |
|---|---|---|---|---|
| 8,121,026 B2* | 2/2012 | Liu | ........................ | G06F 16/21 370/255 |
| 8,909,812 B2* | 12/2014 | Huang | .................. | H04L 69/167 709/246 |
| 10,749,842 B2* | 8/2020 | Kim | .................... | H04L 61/2514 |
| 10,880,264 B1* | 12/2020 | Chakravarthy Dandangi | ............. | H04L 61/251 |
| 2003/0187882 A1* | 10/2003 | Jinmei | ................ | H04L 63/1466 |
| 2005/0192782 A1* | 9/2005 | Lee | ........................ | H04L 1/0072 703/2 |
| 2007/0266179 A1* | 11/2007 | Chavan | ............... | G06F 13/4022 709/250 |

(Continued)

FOREIGN PATENT DOCUMENTS

| | | | | |
|---|---|---|---|---|
| CN | 111917602 B | * | 11/2021 | ......... H04L 43/0805 |
| WO | WO-2012152180 A1 | * | 11/2012 | ......... H04L 65/4076 |

OTHER PUBLICATIONS

K. Yasar, "MAC address (media access control address)," https://www.techtarget.com/searchnetworking/definition/MAC-address#:~:text=A%20MAC%20address%20(media%20access%20control%20address)%20is%20a%2012,network%20interface%20card%20(NIC), Accessed Jan. 4, 2023, 11 pages.

(Continued)

*Primary Examiner* — Younes Naji
(74) *Attorney, Agent, or Firm* — Ryan, Mason & Lewis, LLP

(57) ABSTRACT

A method comprises receiving a data packet configured in accordance with a first network protocol version, and converting a header portion of the data packet to be configured in accordance with a second network protocol version. The converting comprises identifying a source network protocol address for a source of the data packet in the header portion in accordance with the second network protocol version, and identifying a destination network protocol address for a destination of the data packet in the header portion in accordance with the second network protocol version.

20 Claims, 14 Drawing Sheets

(56) References Cited

U.S. PATENT DOCUMENTS

| | | | |
|---|---|---|---|
| 2011/0083005 A1* | 4/2011 | Sakthikumar | G06F 9/4405 |
| | | | 380/259 |
| 2015/0281069 A1* | 10/2015 | Brzozowski | H04L 45/745 |
| | | | 370/392 |
| 2019/0166090 A1* | 5/2019 | Kim | H04L 69/04 |
| 2020/0322276 A1* | 10/2020 | Krishnamurthy | H04L 47/36 |
| 2022/0210058 A1* | 6/2022 | Bataineh | G06F 13/16 |
| 2023/0107822 A1* | 4/2023 | Su | H04L 69/08 |
| | | | 709/245 |

OTHER PUBLICATIONS

CloudFlare, "What is a DNS AAAA record?" https://www.cloudflare.com/learning/dns/dns-records/dns-aaaa-record/, Accessed Jan. 4, 2023, 3 pages.

M. Duo, "IPV4 vs IPV6—What's The Difference Between the Two Protocols?" https://kinsta.com/blog/ipv4-vs-ipv6/, Dec. 5, 2022, 15 pages.

J. Le, "The 4-Layer Internet Model Network Engineers Need to Know," https://le-james94.medium.com/the-4-layer-internet-model-network-engineers-need-to-know-e78432614a4f, Dec. 21, 2017, 21 pages.

* cited by examiner

| | IPv4 | IPv6 |
|---|---|---|
| Internet Protocol Version | 4 | 6 |
| Src | IPv4 interface address | IPv6 interface address |
| Dst | IPv4 interface address | IPv6 interface address |
| Version | 4 | 6 |
| Header length | Calculated and updated | - |
| Total length | Payload + Header length | - |
| Payload length | - | Payload length |
| Time to live | Default value 128 | - |
| Hop limit | - | Default value 64 |
| Header checksum | Calculated and updated | - |
| Protocol/Next Header | Protocol - TCP | Next Header - TCP |
| Source Address | IPv4 interface address | IPv6 interface address |
| Destination Address | IPv4 interface address | IPv6 interface address |

FIG. 5A — IPv4 packet (501)

FIG. 5B — IPv6 packet (502)

Sample IPv4 packet:
Frame 10451: 8275 bytes on wire (66200 bits), 8275 bytes captured (66200 bits) on interface \Device\NPF_{8B62C933-1D38-43BC-8152-A70F1A33C228}, id 0
Ethernet II, Src: VMware_9a:25:ff (00:50:56:9a:25:ff), Dst: IETF-VRRP-VRID_1f (00:00:5f:00:01:1f)
    Destination: IETF-VRRP-VRID_1f (00:00:5f:00:01:1f)
    Source: VMware_9a:25:ff (00:50:56:9a:25:fe)
    Type: IPv4 (0x0800)
Internet Protocol Version 4, Src: 10.49.69.124, Dst: 100.201.213.43
    0100 .... = Version: 4
    .... 0101 = Header Length: 20 bytes (5)
    Differentiated Services Field: 0x00 (DSCP: CS0, ECN: Not-ECT)
    [Total Length: 8261 bytes (reported as 0, presumed to be because of "TCP segmentation offload" (TSO))]
    Identification: 0xaeb6 (44726)
    Flags: 0x40, Don't fragment
    ...0 0000 0000 0000 = Fragment Offset: 0
    Time to Live: 128
    Protocol: TCP (6)
    Header Checksum: 0x0000 [validation disabled]
    [Header checksum status: Unverified]
    Source Address: 10.49.69.124
    Destination Address: 100.201.213.43

Transmission Control Protocol, Src Port: 53062, Dst Port: 443, Seq: 14726682, Ack: 4776, Len: 8221
    Source Port: 53062
    Destination Port: 443
    [Stream index: 10]
    [Conversation completeness: Incomplete, DATA (15)]
    [TCP Segment Len: 8221]
    Sequence Number: 14726682    (relative sequence number)
    Sequence Number (raw): 1276967164
    [Next Sequence Number: 14734903    (relative sequence number)]
    Acknowledgment Number: 4776    (relative ack number)
    Acknowledgment number (raw): 1053024747
    0101 .... = Header Length: 20 bytes (5)
    Flags: 0x018 (PSH, ACK)
    Window: 1026
    [Calculated window size: 262656]
    [Window size scaling factor: 256]
    Checksum: 0xa5bc [unverified]
    [Checksum Status: Unverified]
    Urgent Pointer: 0
    [Timestamps]
        [Time since first frame in this TCP stream: 7.938330000 seconds]
        [Time since previous frame in this TCP stream: 0.000056000 seconds]
    [SEQ/ACK analysis]
        [iRTT: 0.033501000 seconds]
        [Bytes in flight: 65768]
        [Bytes sent since last PSH flag: 8221]
    TCP payload (8221 bytes)
Transport Layer Security 800 (continued)

FIG. 8B

Sample IPv6 packet:
Frame 4338: 8295 bytes on wire (66360 bits), 8295 bytes captured (66360 bits) on interface \Device\NPF_{8B62C933-1D38-43BC-8152-A70F1A33C228}, id 0
Ethernet II, Src: VMware_9a:25:ff (00:50:56:9a:25:ff), Dst: ICANNIAN_00:02:83 (00:00:5e:00:02:83)
    Destination: ICANNIAN_00:02:83 (00:00:5e:00:02:83)
    Source: VMware_9a:25:ff (00:50:56:9a:25:ff)
    Type: IPv6 (0x86dd)
Internet Protocol Version 6, Src: 2500:f2b1:f032:12:c99e:3e06:8134:e537, Dst: 2500:f2b1:71:100::24
    0110 .... = Version: 6
    .... 0000 0000 ........ ........ = Traffic Class: 0x00 (DSCP: CS0, ECN: Not-ECT)
    .... 0001 1101 0100 0110 1101 = Flow Label: 0x1d46d
    Payload Length: 8241
    Next Header: TCP (6)
    Hop Limit: 64
    Source Address: 2500:f2b1:f032:12:c99e:3e06:8134:e537
    Destination Address: 2500:f2b1:71:100::24

FIG. 9A

Transmission Control Protocol, Src Port: 60502, Dst Port: 443, Seq: 17513678, Ack: 4776, Len: 8221
    Source Port: 60502
    Destination Port: 443
    [Stream index: 12]
    [Conversation completeness: Complete, WITH_DATA (31)]
    [TCP Segment Len: 8221]
    Sequence Number: 17513678    (relative sequence number)
    Sequence Number (raw): 1046494559
    [Next Sequence Number: 17521899    (relative sequence number)]
    Acknowledgment Number: 4776    (relative ack number)
    Acknowledgment number (raw): 1466353696
    0101 .... = Header Length: 20 bytes (5)
    Flags: 0x018 (PSH, ACK)
    Window: 1027
    [Calculated window size: 262912]
    [Window size scaling factor: 256]
    Checksum: 0x9163 [unverified]
    [Checksum Status: Unverified]
    Urgent Pointer: 0
    [Timestamps]
        [Time since first frame in this TCP stream: 10.305718000 seconds]
        [Time since previous frame in this TCP stream: 0.000048000 seconds]
    [SEQ/ACK analysis]
        [iRTT: 0.038027000 seconds]
        [Bytes in flight: 57547]
        [Bytes sent since last PSH flag: 8221]
    TCP payload (8221 bytes)
Transport Layer Security 900 (continued)

FIG. 9B

CONVERSION OF DATA PACKETS BASED ON INTERNET PROTOCOL VERSION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to data packet management in such information processing systems.

BACKGROUND

For legacy applications and programs currently configured for the Internet Protocol version 4 (IPv4) network environment, there is a need for compatibility with the Internet Protocol version 6 (IPv6) network environment. There are various challenges to enable support for IPv6 in legacy applications. For example, to upgrade to IPv6, some legacy applications might need extensive re-engineering, and after the such re-engineering, there are no guarantees that the legacy application will be capable of operating with an IPv6 enabled infrastructure.

SUMMARY

Embodiments provide a platform and techniques for conversion of data packets between first and second Internet Protocol (IP) versions.

For example, in one embodiment, a method comprises receiving a data packet configured in accordance with a first network protocol version, and converting a header portion of the data packet to be configured in accordance with a second network protocol version. The converting comprises identifying a source network protocol address for a source of the data packet in the header portion in accordance with the second network protocol version, and identifying a destination network protocol address for a destination of the data packet in the header portion in accordance with the second network protocol version.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 4 depicts a table illustrating treatment of different fields of a header portion of a data packet in connection with data packet conversion between first and second IP versions in an illustrative embodiment.

FIG. 5A depicts a data packet configured in accordance with IPv4 in an illustrative embodiment.

FIG. 5B depicts a data packet configured in accordance with IPv6 in an illustrative embodiment.

FIGS. 8A and 8B depict code corresponding to a sample IPv4 data packet in an illustrative embodiment.

FIGS. 9A and 9B depict code corresponding to a sample IPv6 data packet in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

Figure 1:
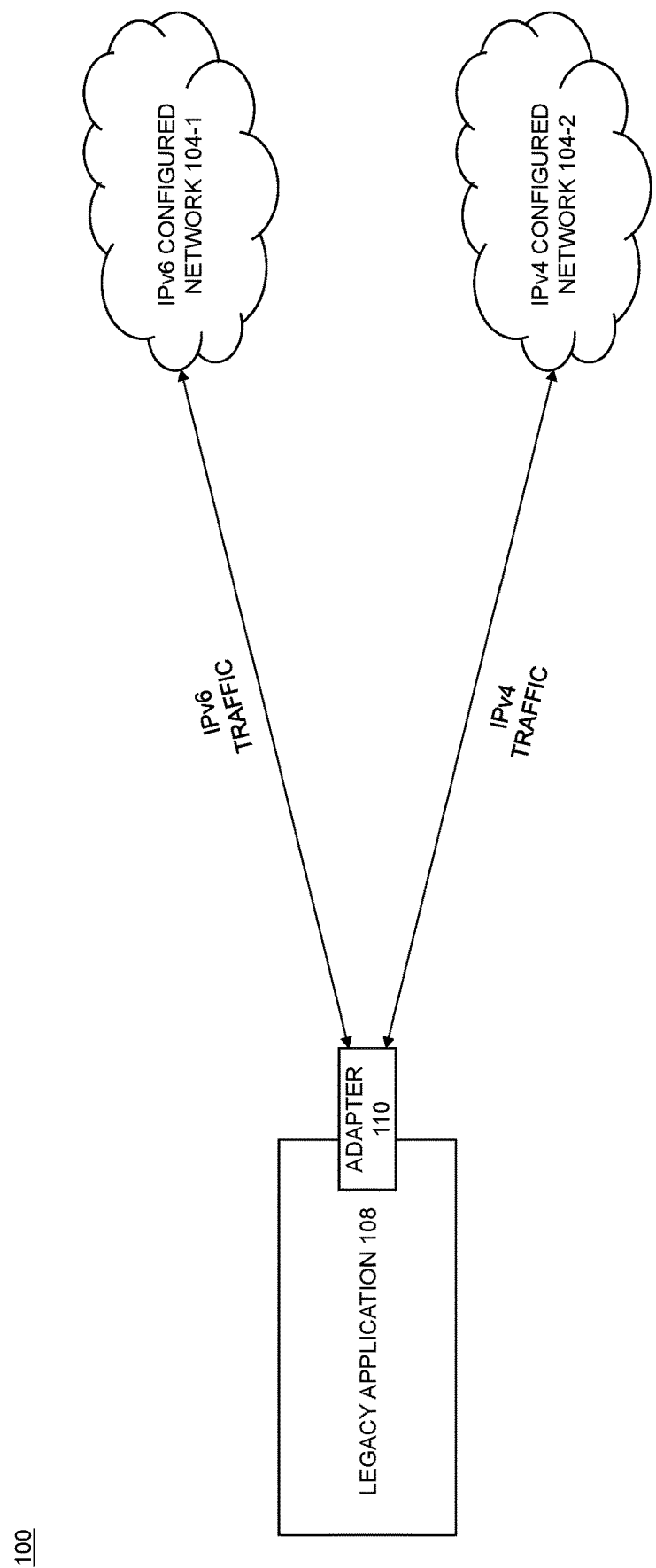
FIG. 1 depicts an overview of the operation of a platform for conversion of data packets between first and second IP versions in an illustrative embodiment.

FIG. 1 depicts an operational flow 100 of a platform for conversion of data packets between first and second IP versions. The platform includes, but is not necessarily limited to, an adapter 110, which operates in firmware of a host device that hosts an application (e.g., legacy application 108). The illustrative embodiments provide a technical solution with techniques for performing conversion of IPv4 data packets to IPv6 data packets and vice-versa without requiring re-design or modification of a legacy application 108. Referring also to the information processing system 200 in FIG. 2, the illustrative embodiments utilize an application layer wrapper (adapter 210 or adapter 110) which operates in firmware 205 of a host device 202 where the legacy application 208 (or 108) is hosted. The adapter 110/210 is configured to transform IPv4 data packets to IPv6 packets and vice versa based, at least in part on configured parameters (explained in more detail herein), and provide support for bi-directional communication with IPv6 and IPv4 configured networks 104-1 and 104-2. The IPv6 and IPv4 configured networks 104-1 and 104-2 are collectively represented as networks 204 in FIG. 2. As shown in FIG. 1, IPv6 and IPv4 network traffic is transmitted to and from the legacy application 108 (or 208) via the adapter 110 (or 210), which performs conversion of the incoming and outgoing data packets as needed.

In accordance with illustrative embodiments, the adapter 110/210 performs rule-based conversion of outgoing IPv4 packets to IPv6 packets from an IPv4 configured legacy application 108/208 so that the data packets can be transmitted in accordance with specifications of an IPv6 configured network 104-1. In accordance with illustrative embodiments, the adapter 110/210 performs rule-based conversion of incoming IPv6 packets from the IPv6 configured network 104-1 to IPv4 packets so that the IPv4 configured legacy application 108/208 can receive the packets. In the case of IPv4 network traffic, the adapter does not need to perform any packet conversion for data packets being transmitted from or to the IPv4 configured legacy application 108/208. In performing the conversion, the adapter 110/210 re-configures and modifies the headers present in the packets based on IPv4 or IPv6 requirements. The embodiments advantageously permit IPv4 configured legacy applications to send and receive data using IPv6 network environments without re-designing or modifying the existing legacy applications.

Referring back to FIG. 2, the host device 202 comprises an operating system (OS) 203 including at least one hosting application 206, where the legacy application 208 is hosted. The hosting application 206 may be an Internet Information Services (IIS) application. The OS 203 includes a firewall 207. The OS 203 is connected to firmware 205, on which the adapter 210 is provided. The adapter 210 includes a rules engine 211 and a conversion engine 212. The host device 202 includes network (N/W) ports 209. Although two N/W ports 209 are shown, the host device 202 may comprise more or less than two N/W ports 209. At least one of the N/W ports 209 is connected to an IPv6 enabled switch 220, which is connected to at least one router 230. The router 230 is connected to the networks 204. The host device 202 communicates with networks 204 via, for example, the router 230.

The host device 202 can comprise, for example, a desktop, laptop or tablet computer, server, storage device, mobile telephone, Internet of Things (IoT) device or other type of processing device. Such a device is an example of what is more generally referred to herein as a "processing device." Some of the processing devices are also generally referred to herein as "computers." The host device 202 may also or alternately comprise virtualized computing resources, such as virtual machines (VMs), containers, etc. The host device 202 in some embodiments comprise a computer associated with a particular company, organization or other enterprise. It is to be understood that although the embodiments are discussed in terms of a host device 202 (e.g., user, customer or client device), the embodiments are not necessarily limited thereto, and may be applied to different devices (e.g., edge or cloud devices).

The terms "user," "customer," "client" or "administrator" herein are intended to be broadly construed so as to encompass numerous arrangements of human, hardware, software or firmware entities, as well as combinations of such entities. At least a portion of the available services and functionalities provided by the adapter 110/210 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Figure 2:
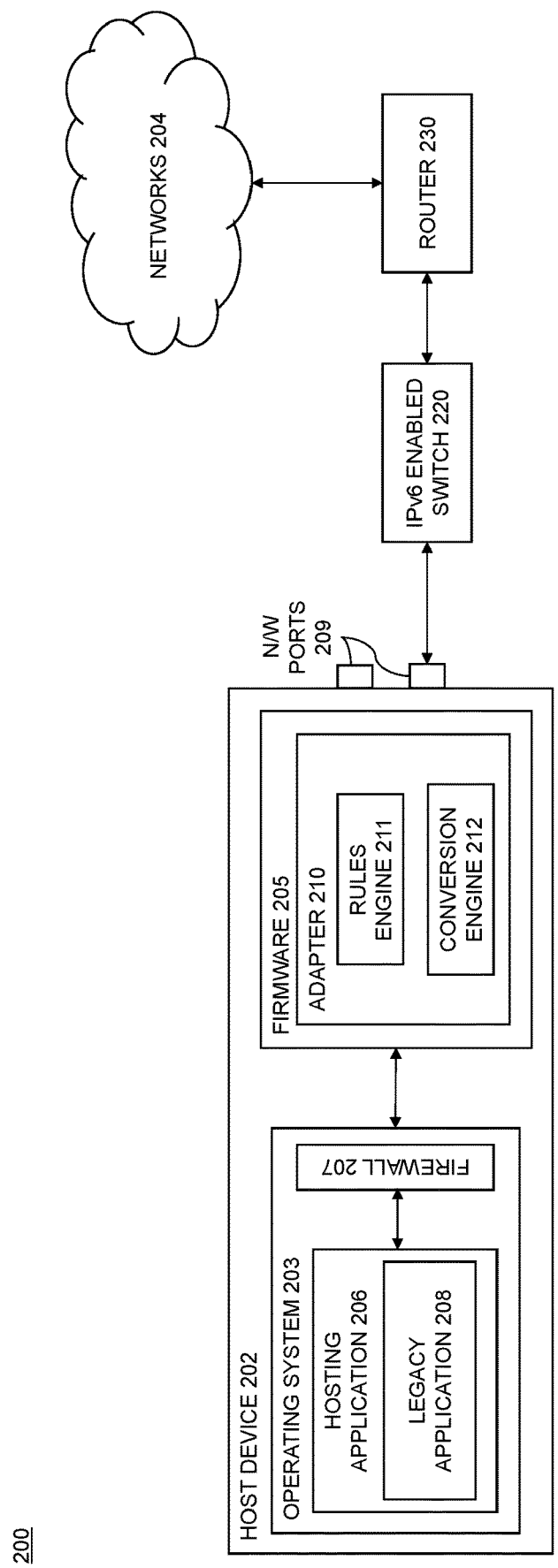
FIG. 2 depicts an information processing system comprising a host device including a platform for conversion of data packets between first and second IP versions in an illustrative embodiment.

Although not explicitly shown in FIG. 2, one or more input-output devices such as keyboards, displays or other types of input-output devices may be used to support one or more user interfaces to the adapter 110/210 and/or host device 202. In some embodiments, the host device 202 is assumed to be associated with repair and/or support technicians, system administrators, information technology (IT) managers, software developers, release management personnel or other authorized personnel configured to access and utilize the adapter 110/210.

The networks 204, which include, for example, the IPv6 and IPv4 configured networks 104-1 and 104-2, comprise at least a portion of a global computer network such as the Internet, although other types of networks can be part of the networks 204, including a wide area network (WAN), a local area network (LAN), a satellite network, a telephone or cable network, a cellular network, a wireless network such as a WiFi or WiMAX network, or various portions or combinations of these and other types of networks. The networks 204 comprise combinations of multiple different types of networks each comprising processing devices configured to communicate using IP or other related communication protocols.

In a non-limiting illustrative example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The adapter 210 is provided in firmware 205 (e.g., OS level firmware) of the host device 202, which can be a server or other device where the legacy application 208 is hosted. The adapter 210 is plugged into one or more N/W ports 209, functioning as a cast on the one or more N/W ports 209. The hosting application 206 and the adapter 210 communicate through the firewall 207. Once enabled, the adapter 210 (or 110) captures the outgoing and incoming data packets and transforms the data packets into IPv6 and IPv4 formats, respectively.

As noted above, the adapter 210 comprises a rules engine 211 and a conversion engine 212. In illustrative embodiments, the rules engine 211 hosts a database (e.g., database 313 in FIG. 3) that saves relevant values for performing packet conversion. The database is used to store information that is consumed by the conversion engine 212 for packet conversion to IPv4 or IPv6 formats. The information includes, for example, a list of physical server ports (e.g., N/W ports 209) and application ports on which the conversion logic of the illustrative embodiments must be active, as well as details of host (local) and destination media access control (MAC) addresses and IP addresses. The rules engine 211 provides the conversion engine 212 with data and configuration settings when needed.

The conversion engine 212 comprises the logic for converting the data packets into the IPv4 or IPv6 formats. The conversion engine 212 uses settings and priorities assigned during configuration (e.g., adapter initialization). The settings and priorities include, for example, port (e.g., N/W port 209) assignment, and destination configuration configured through a power-on self-test (POST) process. Once the settings and priorities are retrieved, the conversion engine 212 converts the data packets from IPv6 to IPv4 formats and vice versa. As explained in more detail herein, the conversion includes modifying, eliminating or adding fields in header portions of the data packets to be configured in accordance with IPv6 or IPv4 formats.

Figure 3:
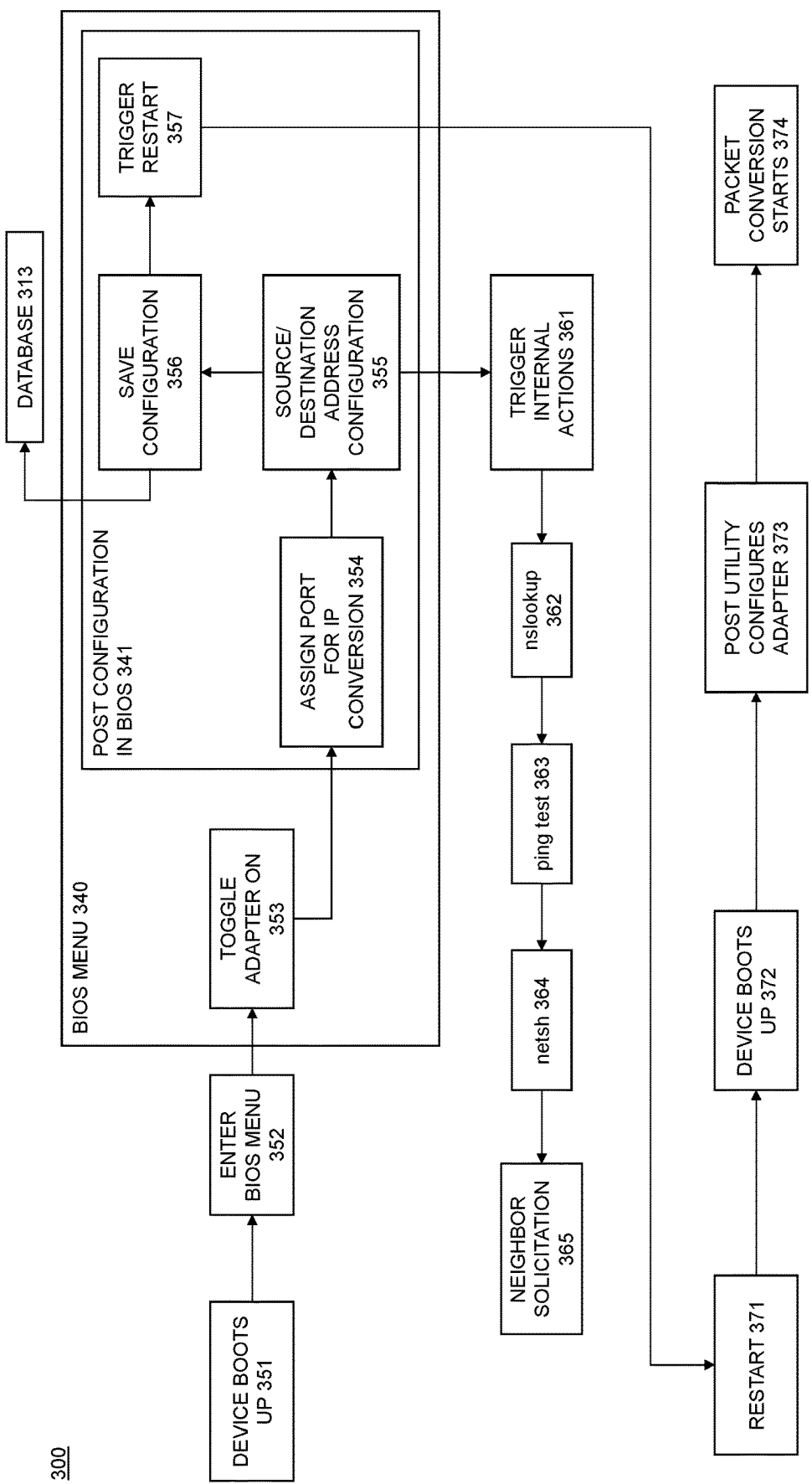
FIG. 3 depicts an operational flow for configuring a platform to perform conversion of data packets between first and second IP versions in an illustrative embodiment.

Referring to FIG. 3, an operational flow 300 for configuring a platform to perform conversion of data packets between first and second IP versions is shown. In illustrative embodiments, to enable the conversion of data packets from IPv6 to IPv4 formats and vice-versa using the adapter 110/210, the adapter 110/210 must be enabled. The adapter 110/210 is enabled using a basic input output system (BIOS) utility to configure the POST process. According to one or more embodiments, a user may configure the BIOS whenever the system boots up. Through the BIOS, a user enters a POST utility and makes modifications in the configurations to enable the adapter 110/210. For example, when a device boots up (block 351), and a BIOS menu 340 is entered (block 352), a plurality of actions are performed to enable and configure the adapter 110/210. For example, through the BIOS menu 340, a user can toggle the adapter 110/210 to be enabled or disabled. Toggling the adapter 110/210 on or off will signify whether a user wants the IPv6/IPv4 conversion to be enabled in their system. In an illustrative embodiment, the default value of this trigger can be "disabled" until manually changed.

For example, at block 353, the adapter 110/210 is toggled on (e.g., enabled), and a POST configuration in BIOS 341 is performed. In the POST configuration in BIOS 341, referring to block 354, a port (e.g., N/W port 209) for IP conversion is assigned. Through this setting, the user can specify the assignment of a physical server port (e.g., N/W port 209) and IP layer port on which conversion of data packets to IPv6 and IPv4 formats is to be performed. Then, referring to block 355, source/destination address configuration is performed where one or more data packet source and/or destination addresses are specified and configured. For example, source addresses may correspond to sources associated with the legacy application 108/208 from where data packets are transmitted over networks 204, and sources from where data packets are transmitted to the legacy application 108/208 over the networks 204. Destination addresses may correspond to destinations associated with the legacy application 108/208 where data packets are received and destinations over networks 204 to where data packets are transmitted from the legacy application 108/208. Referring to block 361 (trigger internal actions), once a source and/or a destination address is specified, a plurality of actions are automatically performed to validate and configure the source or destination addresses. For example, at block 362, a name server lookup (nslookup) operation is performed for domain names (e.g., via domain name service (DNS) records) and different IP addresses identifying a source or destination. Then, at block 363, a ping test for the source or destination via relevant uniform resource locators (URLs) and IP addresses is performed to, for example, verify if the address exists and can handle requests. At block 364, different lookups (e.g., neighbor discovery, source or destination cache and global parameters) are performed via network shell (netsh) commands, which allow for displaying of the status of network device roles and components. At block 365, MAC address mapping of a source or destination via neighbor solicitation is performed.

Once the POST configuration is set up in the BIOS utility to enable the adapter 110/210, as per block 356, the configuration information is stored in the database 313 of the rules engine 211 for further use. For example, the data stored in the database 313 includes mappings of source/destination IPv4 IP addresses to source/destination IPv6 IP addresses, computed MAC address details of destinations (e.g., computed via neighbor solicitation), MAC address details of sources obtained via a get MAC address (getmac) command, DNS address (e.g., DNS AAAA record) of sources/destinations and source and destination port details. DNS AAAA records match a domain name to an IPv6 address. In illustrative embodiments, source and destination MAC and port information is used in communication by layers such as, for example, a data link layer and a transport layer, and are not to be stored in any of the header portions of the data packets.

At block 357, once the adapter 110/210 is enabled and the configuration information is stored in the database 313, a restart of the system is triggered. Alternatively, the process waits for the next re-boot. Then, referring to blocks 371 and 372, upon restart, the device again boots up, and at blocks 373 and 374, the POST utility configures the adapter 110/210 as per the stored parameters (e.g., provides the details for enablement of the adapter 110/210) and packet conversion starts upon receipt and transmission of data to and from the legacy application 108/208. Upon enablement of the adapter 110/210, the process for tapping into the networks 204 for the conversion of packets from IPv4 format to IPv6 format and vice-versa starts.

In the illustrative embodiments, packet conversion from IPv4 to IPv6 formats and vice-versa is limited to the header portion of the packets. The data portion of the packets is not altered as it may lead to unsecure decryption of packets. The conversion is performed in the firmware 205 of the host device 202 (e.g., server or other device), where the data packets are presumably secure and safe.

Figures 5A, 5B:
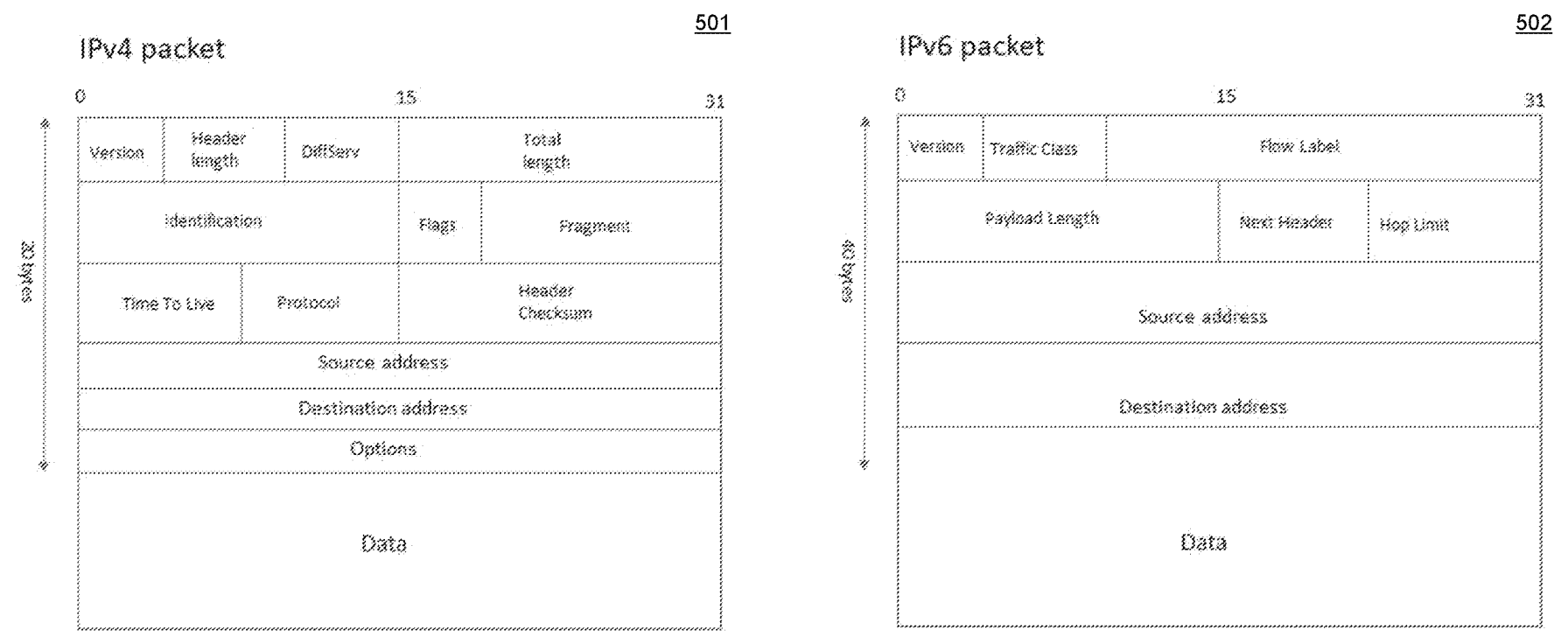

FIG. 4 depicts a table 400 illustrating treatment of different fields of a header portion of a data packet in connection with data packet conversion between IPv4 and IPv6 formats. In addition, FIGS. 5A and 5B respectively depict data packets 501 and 502 configured in accordance with IPv4 and IPv6. Referring to FIGS. 4, 5A and 5B, the IP version ("Version" in FIGS. 5A and 5B) (e.g., IPv4 or IPv6) is identified in the header portion of a data packet, such that the IP version identification changes when the conversion engine 212 converts the data packet from IPv4 to IPv6 format and vice-versa. In addition, IP addresses are specified differently between IPv4 and IPv6 formats. For example, referring to the code for the sample IPv4 packet 800 in FIGS. 8A and 8B, source (Src) and destination (Dst) IPv4 IP addresses are Src: 10.49.69.124 and Dst: 100.201.213.43, and referring to the code for the sample IPv6 packet 900 in FIGS. 9A and 9B, source and destination IPv6 addresses are Src: 2500:f2b1:f032:12:c99e:3e06:8134:e537 and Dst: 2500:f2b1:71:100::24. In illustrative embodiments, the conversion engine 212 identifies the source and destination IP addresses in the header portion of the packet according to the corresponding IP version (e.g., IPv4 or IPv6). For example, when converting from IPv4 to IPv6 formats, the source and destination addresses in the header portion are changed from IPv4 format to IPv6 formats. The conversion engine 212 uses the stored mappings of source/destination IPv4 IP addresses to source/destination IPv6 IP addresses from the database of the rules engine 211 to make the modifications to the source and destination addresses in the header portion.

Referring to the table 400 in FIG. 4, and to the code for the sample IPv4 and IPv6 packets 800 and 900, the source and destination addresses can appear multiple times in a data packet header portion (e.g., under Src, Dst, source address and destination address labels), and are each updated accordingly by the conversion engine 212 in a conversion process. The source address and destination address fields are illustrated in the data packets 501 and 502 in FIGS. 5A and 5B. In addition, referring to the table 400 in FIG. 4, and to the code for the sample IPv4 and IPv6 packets 800 and 900, and identification of the IP version (e.g., IPv4, IPv6, 4, 6) can appear multiple times in a data packet header portion, and are each updated accordingly by the conversion engine 212 in a conversion process.

Referring to the table 400 in FIG. 4, and to the data packets 501 and 502 in FIGS. 5A and 5B, the IPv4 data packet 501 includes a field for time to live (TTL) and the IPv6 data packet 502 includes a field for hop limit. When converting from IPv4 to IPv6, a hop limit value instead of a time to live value is specified in the header portion of the IPv6 data packet, and when converting from IPv6 to IPv4, a time to live value instead of a hop limit value is specified in the header portion of the IPv4 data packet. Time to live and hop limit values are further shown in the code for the sample IPv4 and IPv6 packets 800 and 900 in FIGS. 8A, 8B, 9A and 9B.

Referring to the table 400 in FIG. 4, and to the data packets 501 and 502 in FIGS. 5A and 5B, the IPv4 data packet 501 includes a total length of the data packet ("Total length") and the IPv6 data packet 502 includes a field for a payload length of the data packet ("Payload length"). When converting from IPv4 to IPv6, a payload length instead of a total length is specified in the header portion of the IPv6 data packet. The total length comprises the payload length plus a length of the header portion. For example, for a payload length of 8241 bytes (e.g., amount of the data portion ("Data")), the total length for the IPv4 packet 501 is 8261 bytes since the header portion is 20 bytes. In the IPv6 data packet 502, the payload length of 8241 (e.g., amount of the data portion ("Data")) is specified and excludes the length of the header portion (e.g., 40 bytes). When converting from IPv6 to IPv4, a total length (e.g., 8261 bytes) instead of a payload length (e.g., 8241 bytes) is specified in the header portion of the IPv4 data packet. Total length and payload length are further shown in the code for the sample IPv4 and IPv6 packets 800 and 900 in FIGS. 8A, 8B, 9A and 9B. In computing the total length, the conversion engine computes the payload length and length of the header portion. As can be seen in FIGS. 4, 5A, 5B, 8A, 8B, 9A and 9B, the header length can be a separate field in the IPv4 data packet (e.g., 501 and 800), but may be omitted from the IPv6 data packet (e.g., 502 and 900).

As can be seen in FIGS. 4, 5A, 5B, 8A, 8B, 9A and 9B, a header checksum (e.g., hash value) can be a separate field in the IPv4 data packet (e.g., 501 and 800), but may be omitted from the IPv6 data packet (e.g., 502 and 900). When converting from IPv6 to IPv4, a checksum of the header portion is computed and specified in the header portion of the IPv4 data packet. When converting from IPv4 to IPv6, these fields are removed and omitted from the header portion of the IPv6 data packet.

Referring to the table 400 in FIG. 4, and to the data packets 501 and 502 in FIGS. 5A and 5B, the IPv4 data packet 501 includes a field for protocol (e.g., transmission control protocol (TCP)) and the IPv6 data packet 502 includes a field for next header (also TCP). In an illustrative embodiment, the same values are stored for each field, just under different names. When converting from IPv4 to IPv6, next header instead of protocol is specified in the header portion of the IPv6 data packet, and when converting from IPv6 to IPv4, protocol instead of a next header is specified in the header portion of the IPv4 data packet. Protocol and next header values are further shown in the code for the sample IPv4 and IPv6 packets 800 and 900 in FIGS. 8A, 8B, 9A and 9B.

As can be seen in FIGS. 4, 5A, 5B, 8A, 8B, 9A and 9B, Diffserv (Differentiated Services), Identification, Flags, and Fragment are separate fields in the IPv4 data packet (e.g., 501 and 800), but may be omitted from the IPv6 data packet (e.g., 502 and 900). When converting from IPv6 to IPv4, these fields are generated and values therefor are specified in the header portion of the IPv4 data packet. When converting from IPv4 to IPv6, these fields are removed and omitted from the header portion of the IPv6 data packet.

As can be seen in FIGS. 4, 5A, 5B, 8A, 8B, 9A and 9B, Traffic Class and Flow Label are separate fields in the IPv6 data packet (e.g., 502 and 900), but may be omitted from the IPv4 data packet (e.g., 501 and 800). When converting from IPv4 to IPv6, these fields are generated and values therefor are specified in the header portion of the IPv6 data packet. When converting from IPv6 to IPv4, these fields are removed and omitted from the header portion of the IPv4 data packet.

IPv4 or IPv6 data packets include data related to different layers of a network stack. In illustrative embodiments values for the network access layer, transport layer or application layer are not changed, as the values are the same for IPv4 and IPv6 configurations. Additionally, not having any impact on network access, transport and application layer data ensures the safety of communications and prevents unwanted threats to or compromises of the data being transmitted. The illustrative embodiments modify IPv4 and IPv6 related data which corresponds to the Internet layer.

Figure 6:
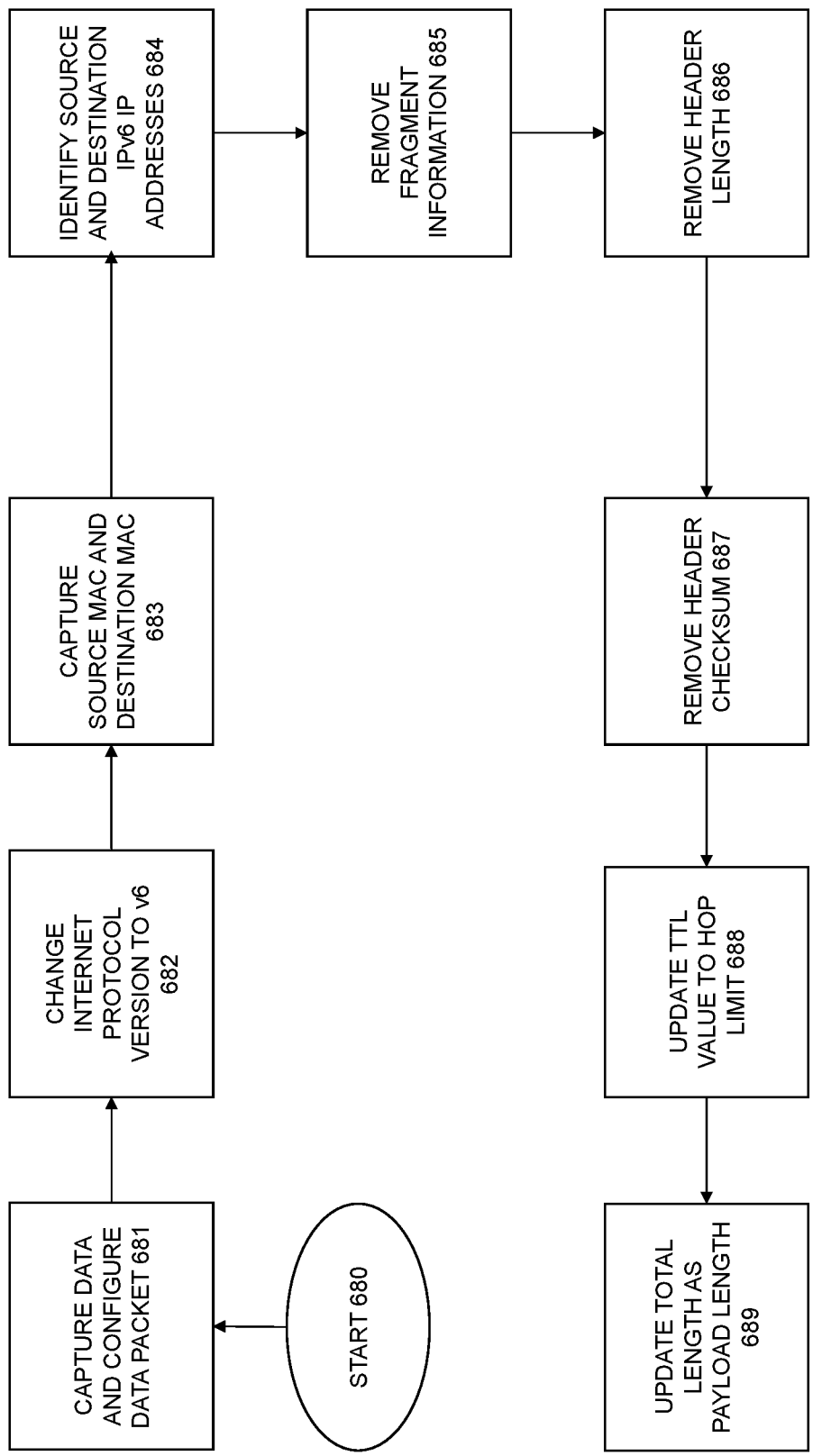
FIG. 6 depicts an operational flow for conversion of a data packet from a configuration corresponding to IPv4 to a configuration corresponding to IPv6 in an illustrative embodiment.

Referring to the operational flow 600 for conversion of a data packet from a configuration corresponding to IPv4 to a configuration corresponding to IPv6 in FIG. 6, the conversion from an IPv4 format to an IPv6 format in an illustrative embodiment, includes at the beginning of the operational flow 600 (start 680), step 681, where data (e.g., from the legacy application 108/208 and from the database in the rules engine 211) is captured and the data packet in configured in accordance with IPv6 (adding, removing and/or modifying header fields according to IPv6 format). At step

682, the IP version in the header portion is changed to version 6. At step 683, data source and destination MAC addresses as described herein are captured, and at step 684, source and destination IPv6 IP addresses are identified in the header portion of the data packet. At step 685, fragment information is removed from the data packet header. At steps 686 and 687, header length and header checksum are removed from the data packet header. At step 688, the TTL value is changed to a hop limit value in the header portion of the data packet, and at step 689, an indication of the total length of the data packet in the header portion is changed to an indication of the payload length of the data portion.

Figure 7:
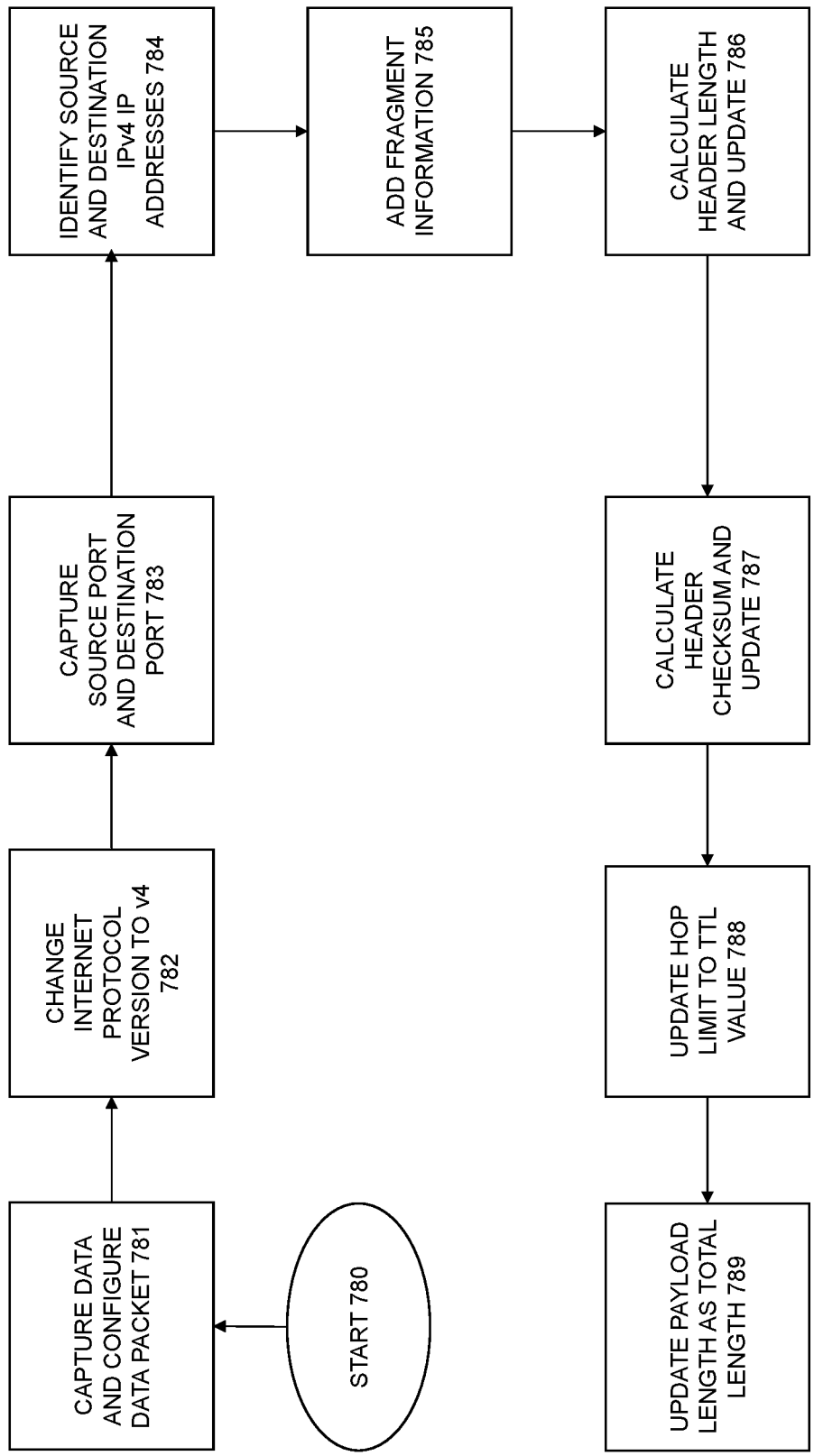
FIG. 7 depicts an operational flow for conversion of a data packet from a configuration corresponding to IPv6 to a configuration corresponding to IPv4 in an illustrative embodiment.

Referring to the operational flow 700 for conversion of a data packet from a configuration corresponding to IPv6 to a configuration corresponding to IPv4 in FIG. 7, the conversion from an IPv6 format to an IPv4 format in an illustrative embodiment, includes at the beginning of the operational flow 700 (start 780), step 781, where data (e.g., from the legacy application 108/208 and from the database in the rules engine 211) is captured and the data packet in configured in accordance with IPv4 (adding, removing and/or modifying header fields according to IPv4 format). At step 782, the IP version in the header portion is changed to version 4. At step 783, data source and destination MAC addresses as described herein are captured, and at step 784, source and destination IPv4 IP addresses are identified in the header portion of the data packet. At step 785, fragment information is added to the data packet header. At steps 786 and 787, header length and header checksum are computed and added to the data packet header. At step 788, the hop limit value is changed to a TTL value in the header portion of the data packet, and at step 789, an indication of the payload length of the data portion in the header portion is changed to an indication of the total length of the data packet.

Once the conversions are performed, newly configured packets can be transmitted to the network layer (e.g., networks 204) where they are forwarded to designated destinations based upon their destination addresses. The illustrative embodiments enable successful conversion of packets from IPv4 to IPv6 formats and vice-versa without having to re-design or make any changes to an existing legacy application 108/208.

The described techniques can be configured for us in different types of environments. For example, in a pure IPv6 network or a hybrid IPv4 and IPv6 network, enablement of the adapter 110/210 will permit legacy applications 108/208 which are configured in accordance with IPv4 conventions to communicate over IPv6 configured networks.

According to one or more embodiments, the database 313 and other data repositories or databases referred to herein can be configured according to a relational database management system (RDBMS) (e.g., PostgreSQL). In some embodiments, the database 313 and other data repositories or databases referred to herein are implemented using one or more storage systems or devices associated with the data packet conversion platform comprising the adapter 110/210. In some embodiments, one or more of the storage systems utilized to implement database 313 and other data repositories or databases referred to herein comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

The adapter 110 and adapter 210 comprising the rules engine 211 and conversion engine 212 in the FIG. 1 and FIG. 2 embodiments are each assumed to be implemented using at least one processing device. Each such processing device generally comprises at least one processor and an associated memory, and implements one or more functional modules for controlling certain features of the adapter 110 and adapter 210 comprising the rules engine 211 and conversion engine 212.

At least portions of the data packet conversion platform comprising the adapter 110/210 and the elements thereof may be implemented at least in part in the form of software that is stored in memory and executed by a processor. The data packet conversion platform comprising the adapter 110/210 and the elements thereof comprise further hardware and software required for running the data packet conversion platform comprising the adapter 110/210, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

It is assumed that the data packet conversion platform comprising the adapter 110/210 and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the data packet conversion platform comprising the adapter 110/210, and the elements thereof can each be implemented in the form of one or more LXCs running on one or more VMs. Other arrangements of one or more processing devices of a processing platform can be used to implement the data packet conversion platform comprising the adapter 110/210, as well as other elements of the data packet conversion platform. Other portions of the system (e.g., system 200) can similarly be implemented using one or more processing devices of at least one processing platform.

It is to be appreciated that these and other features of illustrative embodiments are presented by way of example only, and should not be construed as limiting in any way. Accordingly, different numbers, types and arrangements of system elements such as rules engine 211 and conversion engine 212 and other elements of the data packet conversion platform comprising the adapter 110/210, and the portions thereof can be used in other embodiments.

It should be understood that the particular sets of modules and other elements implemented in the system 200 as illustrated in FIG. 2 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the data packet conversion platform comprising the adapter 110/210 can be offered to cloud infrastructure customers or other users as part of FaaS, CaaS and/or PaaS offerings.

Figure 10:
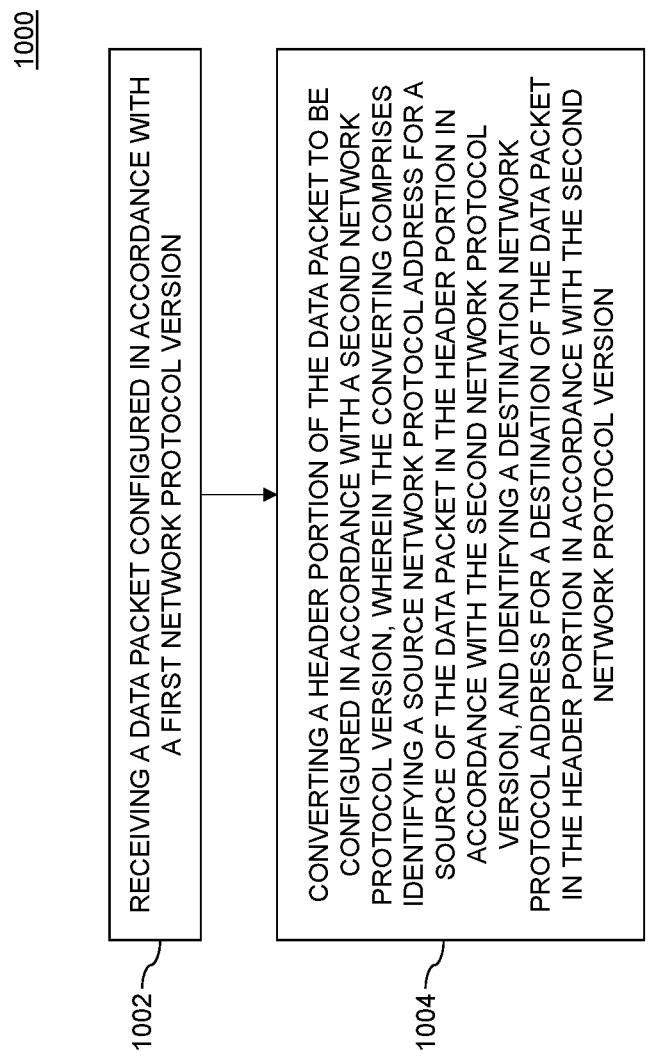
FIG. 10 depicts a process for conversion of data packets between first and second IP versions according to an illustrative embodiment.

The operation of the information processing system 200 will now be described in further detail with reference to the flow diagram of FIG. 10. With reference to FIG. 10, a process 1000 for conversion of data packets between first and second IP versions as shown includes steps 1002 through 1004, and is suitable for use in the system 200 but is more generally applicable to other types of information processing systems comprising a data packet conversion platform for conversion of data packets between first and second IP versions.

In step 1002, a data packet configured in accordance with a first network protocol (e.g., first IP) version is received, and in step 1004 a header portion of the data packet is converted to be configured in accordance with a second network protocol (e.g., second IP) version. The converting comprises identifying a source network protocol (e.g., source IP) address for a source of the data packet in the header portion in accordance with the second network protocol version, and identifying a destination network protocol (e.g., destination IP) address for a destination of the data packet in the header portion in accordance with the second network protocol version. The converting further comprises changing a version specification in the header portion from the first network protocol version to the second network protocol version. The first network protocol version comprises one of IPv4 and IPv6, and the second network protocol version comprises one of IPv4 and IPv6, and is different from the first IP version.

In illustrative embodiments, when the first network protocol version comprises IPv4 and the second network protocol version comprises IPv6, the converting comprises specifying a hop limit value instead of a TTL value in the header portion. When the first network protocol version comprises IPv4 and the second network protocol version comprises IPv6, the converting also comprises specifying a payload length of a data portion of the data packet instead of a total length of the data packet in the header portion, wherein the total length comprises the payload length plus a length of the header portion.

In illustrative embodiments, when the first network protocol version comprises IPv6 and the second network protocol version comprises IPv4, the converting comprises specifying a TTL value instead of a hop limit value in the header portion. When the first network protocol version comprises IPv6 and the second network protocol version comprises IPv4, the converting also comprises specifying a total length of the data packet instead of a payload length of a data portion of the data packet in the header portion, and computing the length of the header portion. When the first network protocol version comprises IPv6 and the second network protocol version comprises IPv4, the converting further comprises computing a checksum of the header portion and specifying the checksum in the header portion. In illustrative embodiments, the converting is performed by firmware and on a port of a device hosting an application configured to one of receive and transmit data of the data packet.

One or more parameters for performing the converting are stored in a database. The one or more parameters comprise, for example, a mapping of one or more first IP version IP addresses for one or more locations to one or more second IP version IP addresses for the one or more locations. The one or more parameters further comprise, for example: (i) MAC addresses for one or more data sources and one or more data destinations; and/or (ii) port details for the one or more data sources and the one or more data destinations.

The one or more parameters are validated through one or more automated techniques such as, for example, nslookup operations, ping tests, other lookup operations (e.g., neighbor discovery, source or destination cache and global parameters), which can be performed via netsh commands, and/or MAC address mapping of sources or destinations via neighbor solicitation operations.

It is to be appreciated that the FIG. 10 process (and FIGS. 3, 6 and 7 processes) and other features and functionality described above can be adapted for use with other types of information systems configured to execute data packets conversion services in a data packet conversion platform or other type of platform.

The particular processing operations and other system functionality described in conjunction with the flow diagrams of FIGS. 3, 6, 7 and 10 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagrams of FIGS. 3, 6, 7 and 10 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a data packet conversion platform as disclosed herein can provide a number of significant advantages relative to conventional arrangements. For example, the embodiments do not require re-engineering of a pre-existing legacy application since the adapter is provided in the firmware (e.g., BIOS) without impacting the legacy application, OS or network control. As an additional advantage, the adapter can be created using secure development techniques by hardware vendors and can be tamper resistant. For example, security measures such as, for example, user authentication and authorization are required with hardware and/or BIOS settings. As a further advantage, the adapter is configured to transform network data into both IPv4 and IPv6 formats, resulting in efficient bi-directional communications (e.g., to and from the legacy applications).

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 200 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the data packet conversion platform comprising the adapter 110/210 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a data packet conversion platform in illustrative embodiments. These and other cloud-based systems in illustrative embodiments can include object stores.

Illustrative embodiments of processing platforms will now be described in greater detail with reference to FIGS. 11 and 12. Although described in the context of system 200, these platforms may also be used to implement at least portions of other information processing systems in other embodiments.

Figure 11:
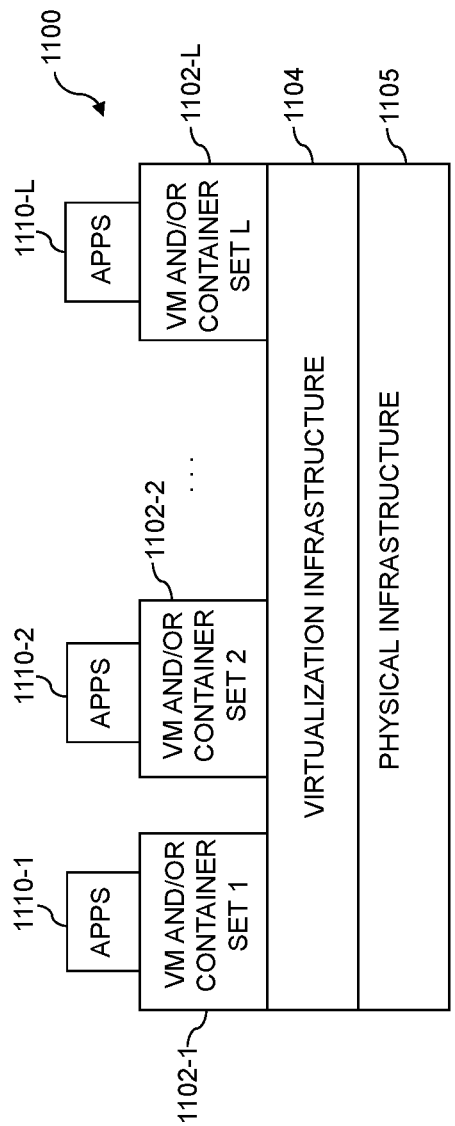
FIGS. 11 and 12 show examples of processing platforms that may be utilized to implement at least a portion of an information processing system according to illustrative embodiments.
Figure 12:
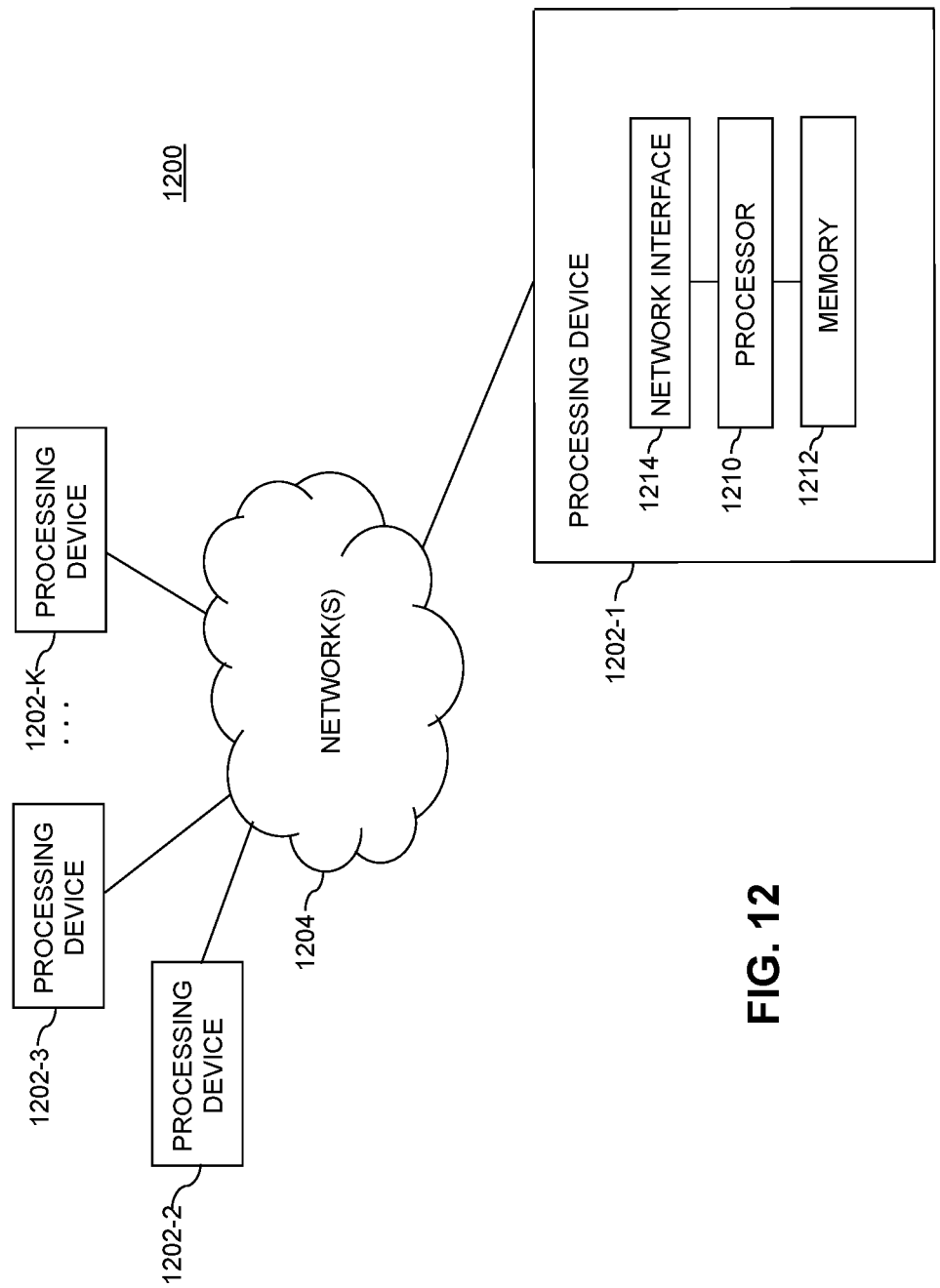

FIG. 11 shows an example processing platform comprising cloud infrastructure 1100. The cloud infrastructure 1100 comprises a combination of physical and virtual processing resources that may be utilized to implement at least a portion of the information processing system 200. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. A hypervisor platform may be used to implement a hypervisor within the virtualization infrastructure 1104, where the hypervisor platform has an associated virtual infrastructure management system. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 200 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 200 and includes a plurality of processing devices, denoted 1202-1, 1202-2, 1202-3, . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212. The processor 1210 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1212 may comprise random access memory (RAM), read-only memory (ROM), flash memory or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 200 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the data packet conversion platform comprising the adapter 110/210 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and data packet conversion platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
   configuring an adapter in firmware of a host device to perform conversion of a plurality of data packets between a first network protocol version and a second network protocol version;
   wherein the host device hosts an application to and from which the plurality of data packets are transmitted; and
   wherein the configuring is performed using a basic input output system of the host device and comprises identifying a port of the host device on which the conversion of the plurality of data packets is to be performed;
   receiving a data packet of the plurality of data packets configured in accordance with the first network protocol version; and
   converting, via the adapter, a header portion of the data packet to be configured in accordance with the second network protocol version;
   wherein the converting comprises:
   identifying a source network protocol address for a source of the data packet in the header portion in accordance with the second network protocol version;
   identifying a destination network protocol address for a destination of the data packet in the header portion in accordance with the second network protocol version; and
   validating at least one of the source network protocol address and the destination network protocol address, wherein the validating comprises:
     executing a ping test for at least one of the source network protocol address and the destination network protocol address; and
     executing one or more lookup operations to identify a status of one or more network device roles and components corresponding to at least one of the source network protocol address and the destination network protocol address, and displaying the status of the one or more network device roles and components;
   wherein the steps of the method are executed by a processing device operatively coupled to a memory.

2. The method of claim 1 wherein the converting further comprises changing a version specification in the header portion from the first network protocol version to the second network protocol version.

3. The method of claim 1 wherein:
   the first network protocol version comprises one of Internet Protocol version 4 (IPv4) and Internet Protocol version 6 (IPv6); and
   the second network protocol version comprises one of IPv4 and IPv6, and is different from the first network protocol version.

4. The method of claim 3 wherein, when the first network protocol version comprises IPv4 and the second network protocol version comprises IPv6, the converting further comprises specifying a hop limit value instead of a time to live value in the header portion.

5. The method of claim 3 wherein, when the first network protocol version comprises IPv4 and the second network protocol version comprises IPv6, the converting further comprises specifying a payload length of a data portion of the data packet instead of a total length of the data packet in the header portion, wherein the total length comprises the payload length plus a length of the header portion.

6. The method of claim 3 wherein, when the first network protocol version comprises IPv6 and the second network protocol version comprises IPv4, the converting further comprises specifying a time to live value instead of a hop limit value in the header portion.

7. The method of claim 3 wherein, when the first network protocol version comprises IPv6 and the second network protocol version comprises IPv4, the converting further comprises specifying a total length of the data packet instead of a payload length of a data portion of the data packet in the header portion, wherein the total length comprises the payload length plus a length of the header portion.

8. The method of claim 7 wherein the converting further comprises computing the length of the header portion.

9. The method of claim 3 wherein, when the first network protocol version comprises IPv6 and the second network protocol version comprises IPv4, the converting further comprises computing a checksum of the header portion and specifying the checksum in the header portion.

10. The method of claim 1 wherein the converting is performed on the identified port of the host device.

11. The method of claim 1 further comprising storing one or more parameters for performing the converting, the one or more parameters comprising at least a mapping of one or more first network protocol version Internet Protocol addresses for one or more locations to one or more second network protocol version Internet Protocol addresses for the one or more locations.

12. The method of claim 11 wherein the one or more parameters further comprise at least one of: (i) media access control (MAC) addresses for one or more data sources and one or more data destinations; and (ii) port details for the one or more data sources and the one or more data destinations.

13. The method of claim 12 further comprising validating the one or more parameters through one or more automated techniques.

14. The method of claim 1, wherein the configuring further comprises specifying one or more data packet source addresses and one or more data packet destination addresses, wherein the one or more data packet source addresses correspond to one or more sources associated with the application from where one or more data packets of the plurality of data packets are transmitted, and the one or more data packet destination addresses correspond to one or more destinations to where the one or more data packets are transmitted from the one or more sources associated with the application.

15. An apparatus comprising:
a processor operatively coupled to a memory and configured:
to configure an adapter in firmware of a host device to perform conversion of a plurality of data packets between a first network protocol version and a second network protocol version;
wherein the host device hosts an application to and from which the plurality of data packets are transmitted; and
wherein the configuring is performed using a basic input output system of the host device and comprises identifying a port of the host device on which the conversion of the plurality of data packets is to be performed;
to receive a data packet of the plurality of data packets configured in accordance with the first network protocol version; and
to convert, via the adapter, a header portion of the data packet to be configured in accordance with the second network protocol version;
wherein, in converting the header portion of the data packet, the processor is configured:
to identify a source network protocol address for a source of the data packet in the header portion in accordance with the second network protocol version;
to identify a destination network protocol address for a destination of the data packet in the header portion in accordance with the second network protocol version; and
to validate at least one of the source network protocol address and the destination network protocol address, wherein the validating comprises:
executing a ping test for at least one of the source network protocol address and the destination network protocol address; and
executing one or more lookup operations to identify a status of one or more network device roles and components corresponding to at least one of the source network protocol address and the destination network protocol address, and displaying the status of the one or more network device roles and components.

16. The apparatus of claim 15 wherein, in converting the header portion of the data packet, the processor is configured to change a version specification in the header portion from the first network protocol version to the second network protocol version.

17. The apparatus of claim 15 wherein:
the first network protocol version comprises one of Internet Protocol version 4 (IPv4) and Internet Protocol version 6 (IPv6); and
the second network protocol version comprises one of IPv4 and IPv6, and is different from the first network protocol version.

18. An article of manufacture comprising a non-transitory processor-readable storage medium having stored therein program code of one or more software programs, wherein the program code when executed by at least one processing device causes said at least one processing device to perform the steps of:
configuring an adapter in firmware of a host device to perform conversion of a plurality of data packets between a first network protocol version and a second network protocol version;
wherein the host device hosts an application to and from which the plurality of data packets are transmitted; and
wherein the configuring is performed using a basic input output system of the host device and comprises identifying a port of the host device on which the conversion of the plurality of data packets is to be performed;
receiving a data packet of the plurality of data packets configured in accordance with the first network protocol version; and
converting, via the adapter, a header portion of the data packet to be configured in accordance with the second network protocol version;
wherein, in converting the header portion of the data packet, the program code causes said at least one processing device:
to identify a source network protocol address for a source of the data packet in the header portion in accordance with the second network protocol version;
to identify a destination network protocol address for a destination of the data packet in the header portion in accordance with the second network protocol version; and
to validate at least one of the source network protocol address and the destination network protocol address, wherein the validating comprises:
executing a ping test for at least one of the source network protocol address and the destination network protocol address; and
executing one or more lookup operations to identify a status of one or more network device roles and components corresponding to at least one of the source network protocol address and the destination network protocol address, and displaying the status of the one or more network device roles and components.

19. The article of manufacture of claim 18 wherein, in converting the header portion of the data packet, the program code causes said at least one processing device to change a version specification in the header portion from the first network protocol version to the second network protocol version.

20. The article of manufacture of claim 18 wherein:
the first network protocol version comprises one of Internet Protocol version 4 (IPv4) and Internet Protocol version 6 (IPv6); and
the second network protocol version comprises one of IPv4 and IPv6, and is different from the first network protocol version.

* * * * *